United States Patent [19]

Lewkowicz et al.

[11] 4,169,520
[45] * Oct. 2, 1979

[54] METHOD AND SYSTEM OF LUBRICATING A PLURALITY OF COMPRESSED AIR OPERATED DEVICES

[75] Inventors: Josef Lewkowicz, Ektorp; Torsten O. Larsson, Karlskoga, both of Sweden

[73] Assignee: Atlas Copco AB, Nacka, Sweden

[ * ] Notice: The portion of the term of this patent subsequent to Apr. 3, 1996, has been disclaimed.

[21] Appl. No.: 906,997

[22] Filed: May 18, 1978

Related U.S. Application Data

[63] Continuation of Ser. No. 678,981, Apr. 21, 1976.

[30] Foreign Application Priority Data

Apr. 24, 1975 [SE] Sweden ................................ 7504760

[51] Int. Cl.² ...................... F16N 13/22; F16N 25/00; F16N 7/32
[52] U.S. Cl. .................. 184/7 D; 184/55 A
[58] Field of Search .................. 184/7 D, 7 CR, 7 C, 184/55 A, 55 R, 6.26, 29

[56] References Cited

U.S. PATENT DOCUMENTS

| | | | |
|---|---|---|---|
| 1,591,159 | 7/1926 | Davis | 184/7 C |
| 1,591,160 | 7/1926 | Davis | 184/7 C |
| 1,974,416 | 9/1934 | Bijur | 184/7 CR |
| 3,406,787 | 10/1968 | Breschinsky | 184/55 A |
| 3,516,516 | 6/1970 | Bertra et al. | 184/55 A |
| 3,516,517 | 6/1970 | Kuhlman | 184/55 A |
| 3,595,341 | 7/1971 | Oglesbee | 184/55 A |
| 3,850,265 | 11/1974 | Blower et al. | 184/7 D |
| 3,905,451 | 9/1975 | Williamson | 184/55 A X |

FOREIGN PATENT DOCUMENTS 123727 3/1931 Austria .
2304910 8/1974 Fed. Rep. of Germany .

Primary Examiner—David H. Brown
Attorney, Agent, or Firm—Flynn & Frishauf

[57] ABSTRACT

The various air motors of a rock drilling rig are supplied with oil through oil lines which are furnished with predetermined metered oil flows from positive displacement pumps that are operated in synchronism with each other by an air operated oscillator. There is a normally closed shut-off valve in each oil line. The respective shut-off valve is opened when the respective air line is pressurized. When a shut-off valve is closed, the respective metered oil flow escapes through a pressure relief valve.

8 Claims, 6 Drawing Figures

4,169,520

METHOD AND SYSTEM OF LUBRICATING A PLURALITY OF COMPRESSED AIR OPERATED DEVICES

This is a continuation of application Ser. No. 678,981, filed Apr. 21, 1976.

BACKGROUND OF THE INVENTION AND OBJECT OF THE INVENTION

This invention relates to a method of lubricating a plurality of compressed air operated devices, for instance motors, that are independently supplied with compressed air. The invention relates also to a lubricant furnishing system for carrying out the method.

The most common way of lubricating compressed air consuming devices—for instance the devices of a rock drilling rig—is to add the lubricating oil to the compressed air by means of venturi nozzles that are connected upstream of the supply valves that control the air to the compressed air consumers. On practical grounds, the supply valves must be located at a distance from the consumers and this fact alone, makes the lubrication ununiform. Still more ununiform it will be if two or more consumers have a common supply valve, which is not unusual. Further, one inherent disadvantage of the venturi principle of lubrication is that the lubricant is added substantially in proportion to the amount of air consumed. Therefore, there must be an average over-supply of lubricant in order to provide adequate lubrication always. It has been suggested instead to use a piston pump integral with an oscillating compressed air piston motor for each consumer. This piston pump is then powered by air from the supply line of the consumer for instance the supply line of the rock drill, and it starts therefore automatically when the rock drill is started. Not only is it expensive to use a pump with motor for each device that is to be lubricated but the lubrication will be ununiform since the pressure in the supply line of for instance a rock drill mounted on a rock drilling rig usually varies substantially so that the drive pressure of the compressed air actuated piston of the lubricator will also vary.

It is an object of the invention to make possible a more precise and accurate dispensing of lubricant to compressed air powered devices than has been possible hitherto. To this end, the invention has been given the characteristics stated in the claims.

DETAILED DESCRIPTION OF ILLUSTRATED EMBODIMENT

Figure 1:
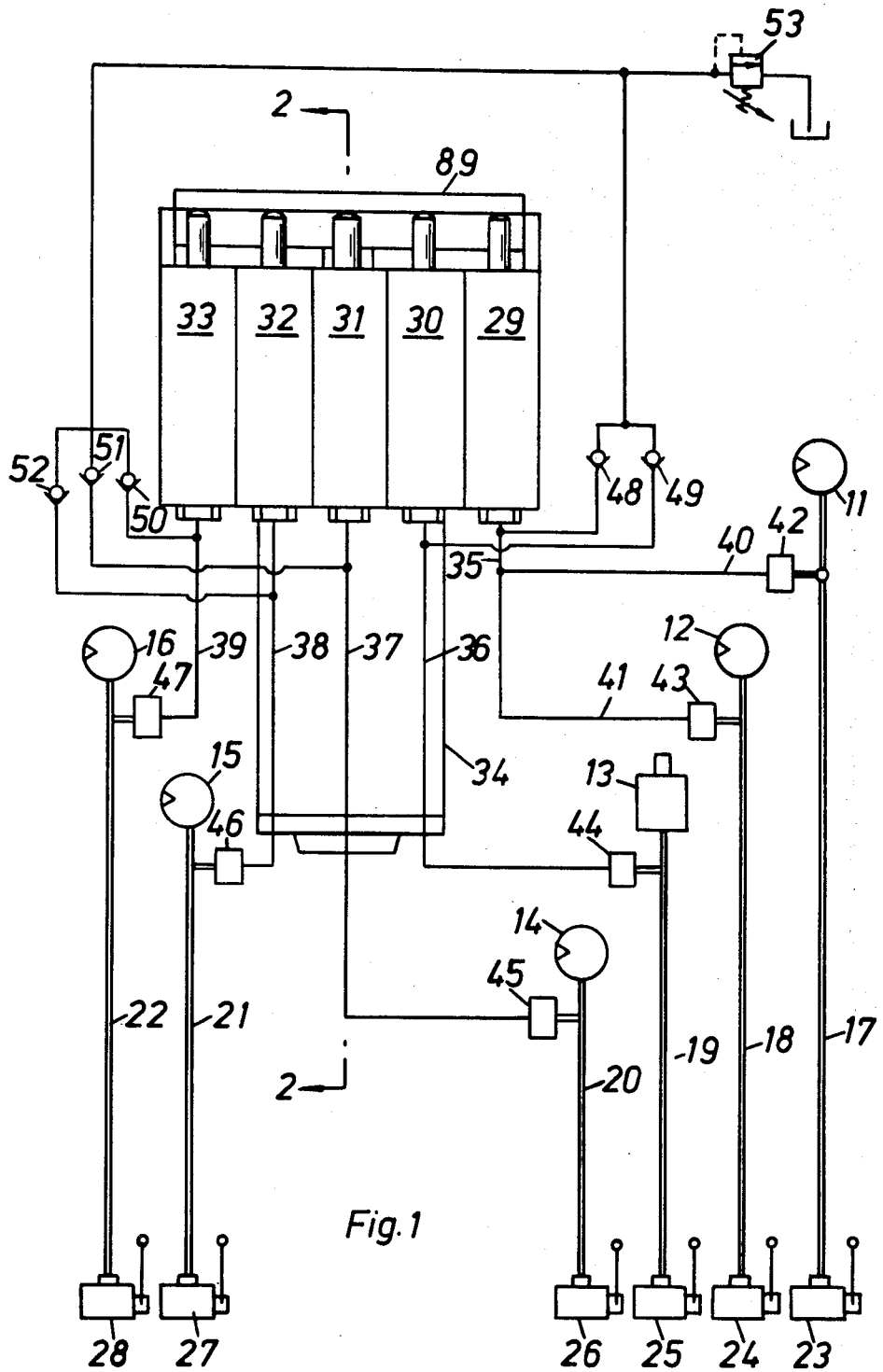
FIG. 1 is a diagrammatic representation of a system for lubricating various air consumers, for instance the air consumers of a rock drilling rig.

In the system shown in FIG. 1, various air consumers 11–16 are shown by symbols. They are supplied with compressed air through supply conduits 17–22 that are controlled by supply valves 23–28. The air consumers 11–16 may symbolize the various air consumers on a rock drilling rig. The motors for moving the drilling rig can be symbolized by 11, the feed motor for a rock drill by 12, the impact motor of the rock drill by 13, the rotation motor of the rock drill by 14, an air motor for driving a generator unit by 15 and an air motor for driving an hydraulic pump by 16. Five piston pumps 29–33 for lubricating oil are driven in synchronism with one another by means of a common actuator device 34 and they deliver oil to oil conduits 35–39. Each oil conduit 36–39 leads to a respective one of the air supply conduits 19–22 whereas the oil conduit 35 is branched into branches 40,41 that lead to the air supply conduits 17 and 18 respectively. In each of the conduits 36–39 and 40 and 41 there is a valve 42–47 that senses the pressure in the respective air supply conduit 17–22 and opens to permit passage of oil to the air supply conduit only when the latter is pressurized. A one-way check valve 48–52 is connected to each oil conduit 35–39 and these check valves are connected to a common, conventional, adjustable, spring loaded pressure relief valve 53. Thus, the check valves 48–52 operate as back pressure controlled pressure relief valves, the back pressure being defined by the common pressure relief valve 53.

Figure 4:
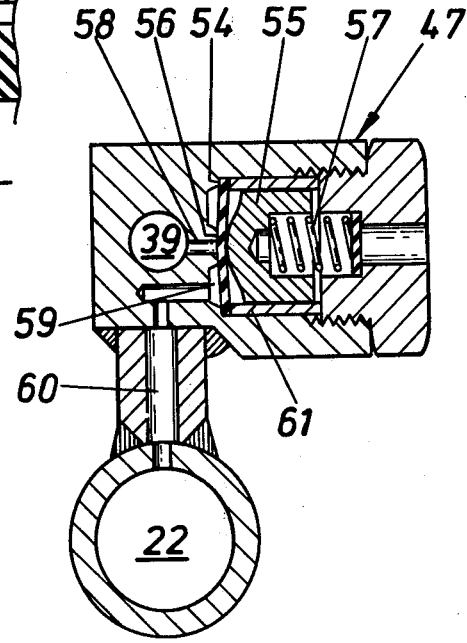
FIG. 4 is a section through one of a plurality of valves that are schematically shown in FIG. 1.

One of the identical valves 42–47, the valve 47, is shown in detail in FIG. 4. It has an elastic membrane 54, for instance a rubber membrane, that is forced against a seat 56 by means of a spring loaded piston 55. The circular edge of the membrane 54 is sealingly clamped against the valve body by means of a sleeve 61. The spring has been given the reference numeral 57. The oil conduit 39 ends with a passage 58 into the seat 56. The passage 58 ends with such a small area in the seat 56 that the oil pressure in the conduit 39 (this oil pressure being defined by the pressure relief valve 53 and being substantially higher than the air line pressure) is not able to overcome the spring 57. Thus, the oil pressure cannot lift the membrane 54 off the seat 56. Around the seat 56, there is formed an annular chamber 59 that is in connection with the air supply conduit 22 by means of a passage 60. The membrane 54 has so large an annular surface towards this chamber 60 that the air pressure lifts the membrane off the seat 56 when the supply conduit 22 is pressurized so that oil can freely flow from the oil conduit 39 to the air supply conduit 22. The valve 47 is again closed when the supply valve 28 is closed and the conduit 22 is vented through the air motor 16. The membrane should be off its seat at an air pressure of about 1 bar above atmospheric pressure in order to provide proper lubrication of a free-running air motor. It is an advantage as to reliability that the shut-off valve 47 operates in response to the pressure and not in response to the flow.

Figure 2:
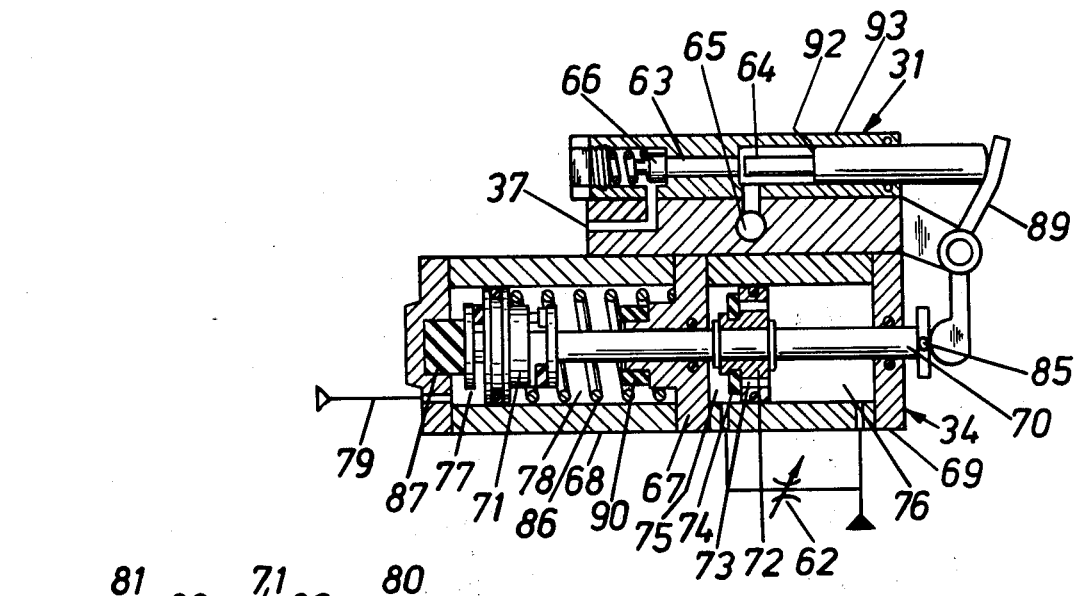
FIG. 2 is a section taken along the line 2—2 in FIG. 1 through a positive displacement lubricant pump and its actuating motor.

In FIG. 2, the pump 31 and its actuating device 34 are shown in longitudinal section. The pump has a housing 92 forming a cylinder 63 and a plunger 64. It is supplied with oil through a feed conduit 65 and it forces oil out through the conduit 37 via a check valve 66. The housing of the actuator 34 is divided by a partition 67 into a cylindrical air portion 68 and a cylindrical hydraulic portion 69. The piston rod 70 has a piston head 71 in the air portion and a piston head 72 in the hydraulic portion. The piston head 72 has through passages 73 provided with a common check valve in the form of a plate 74. The two cylinder chambers 75, 76 formed in the hydraulic cylinder are in communication via a conduit that is provided with a variable restriction 62 and forms a damping circuit.

Figure 3:
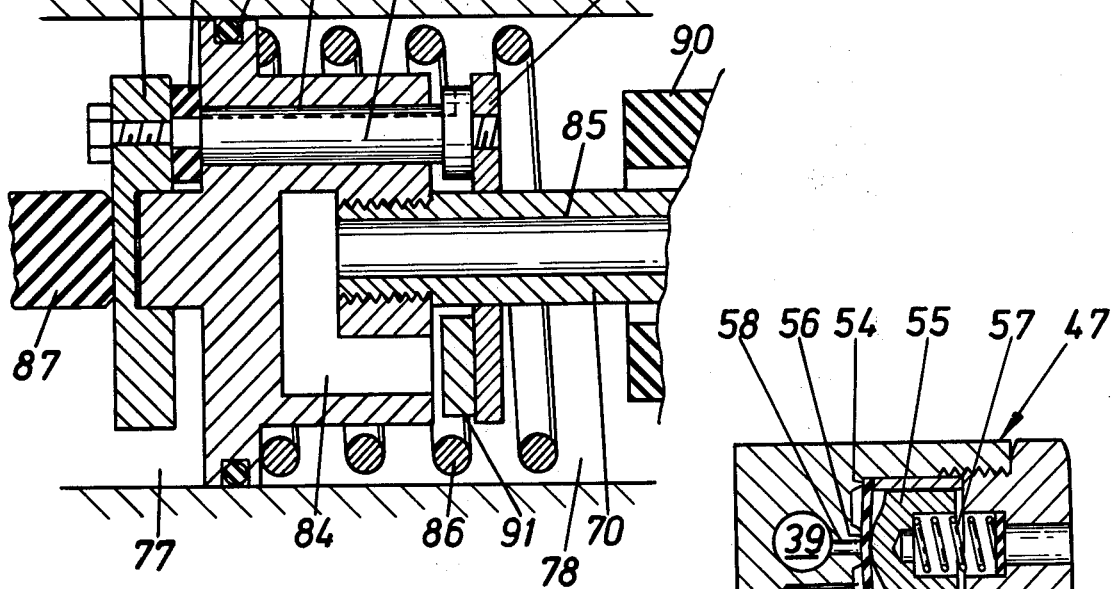
FIG. 3 is an enlarged view of some details of FIG. 2.

The piston head 71 in the air portion separates a cylinder chamber 77 to the left thereof in FIG. 2 from a cylinder chamber 78 to the right thereof, and the cylinder chamber 77 is supplied with compressed air through a supply conduit 79. As is best shown in FIG. 3, the piston head 71 has three axial bores through which three rods 80 slidably extend. The rods 80 unite two end plates 81, 82. The rods have axial recesses 83. The piston head 71 has three passages 84 that lead to a passage 85 that extends out through the piston rod 70 to the atmosphere.

The device that is formed by the end plates 81, 82 and the rods 80 are limitedly axially slidable relative to the piston head 71 as a rigid unit. It forms a valve that makes the piston head 71 and the piston rod 70 reciprocate. The piston head 71 is biased to the left in FIGS. 2 and 3 by means of a spring 86. Assuming that the piston head 71, and with it the piston rod 70 and the piston head 72, has been moved to its left position as indicated in FIGS. 2 and 3 by the action of the spring 86, the end position is defined by a rubber element 87 against which the end plate 81 rests. Then sealing rings 88 around the rods 80 block the passages 83 between the cylinder chambers 77, 78 at the same time as the cylinder chamber 78 is vented through the passages 84, 85. Thus, the piston 71 moves to the right in the figures and this movement is transmitted to the plunger 64 by means of a lever 89. This movement of the piston 71 to the right in the figure is not damped since the check valve 74 in the hydraulic portion is open. Then, when the other end plate 82 abuts against an annular rubber element 90, sealing elements 91 block the passages 84 at the same time as the passages 83 is opened so that the cylinder chamber 78 becomes pressurized. The cylinder chamber 77 is constantly pressurized. Then the spring 86 returns the piston head 71 to its left end position shown in the figures and another work stroke starts in the way described. During the return movement of the piston 71 its velocity is controlled by the hydraulic damping circuit that includes the adjustable restriction 62. The plunger 64 joins the piston 71 in the return movement because of the pressure in the oil supply conduit 65 acting on annular shoulders 92.

Thus, the frequency of the pumps is defined by the easily adjustable restriction 62 of the hydraulic damping circuit. Since this restriction controls the velocity of the return stroke whereas the work stroke is effected by a spring 86, the time for a return movement will be independent of variations in the pressure of the drive air. The work stroke is undamped by the hydraulic circuit 62 and its velocity will depend on the drive pressure, but since the work stroke is normally several times as fast as the return stroke that is controlled by the damping circuit 62, variations in the drive pressure will only slightly affect the frequency of the actuator 34. Thus, the actuator 34 is an adjustable oscillator, the frequency of which is only negligibly influenced by the variations in the pressure of the drive air. It has been found that a frequency higher than about 10 pump strokes per minute should be used. At lower frequencies, the oil consumption must be increased in order to provide adequate lubrication. Preferably, the pumps are dimensioned so that the frequency can be held above 0.5 Hz when used to lubricate rock drills.

In the example rock drilling rig, the actuator 34 is advantageously connected to start its reciprocation as soon as the main supply valve (not illustrated) of the rig is opened. This means that the five pumps 29-33 reciprocate in synchronism and continuously deliver oil flows to the respective conduits 35-39. These metered flows are defined by the frequency of the oscillator and the lubricant flows out through the pressure relief valves 48-52 and through the single pressure relief valve 53 to tank if the valves 42-47 are not open. The oil pressure defined by the pressure relief valve 53 should be higher than the pressure of the drive air and preferably it should be several bars higher.

The motor 11 for moving the rig and the feed motor 12 for feeding the rock drill along its guide can be connected to the same pump 29 without disadvantage since these motors will never be used simultaneously. Therefore, the pump 29 can be regarded as associated either with the motor 11 for moving the rig or with the feed motor 12, but it can never be associated with both motors simultaneously. The various pumps can have different capacity by having different cylinder diameters and different length of their plunges.

Figure 5:
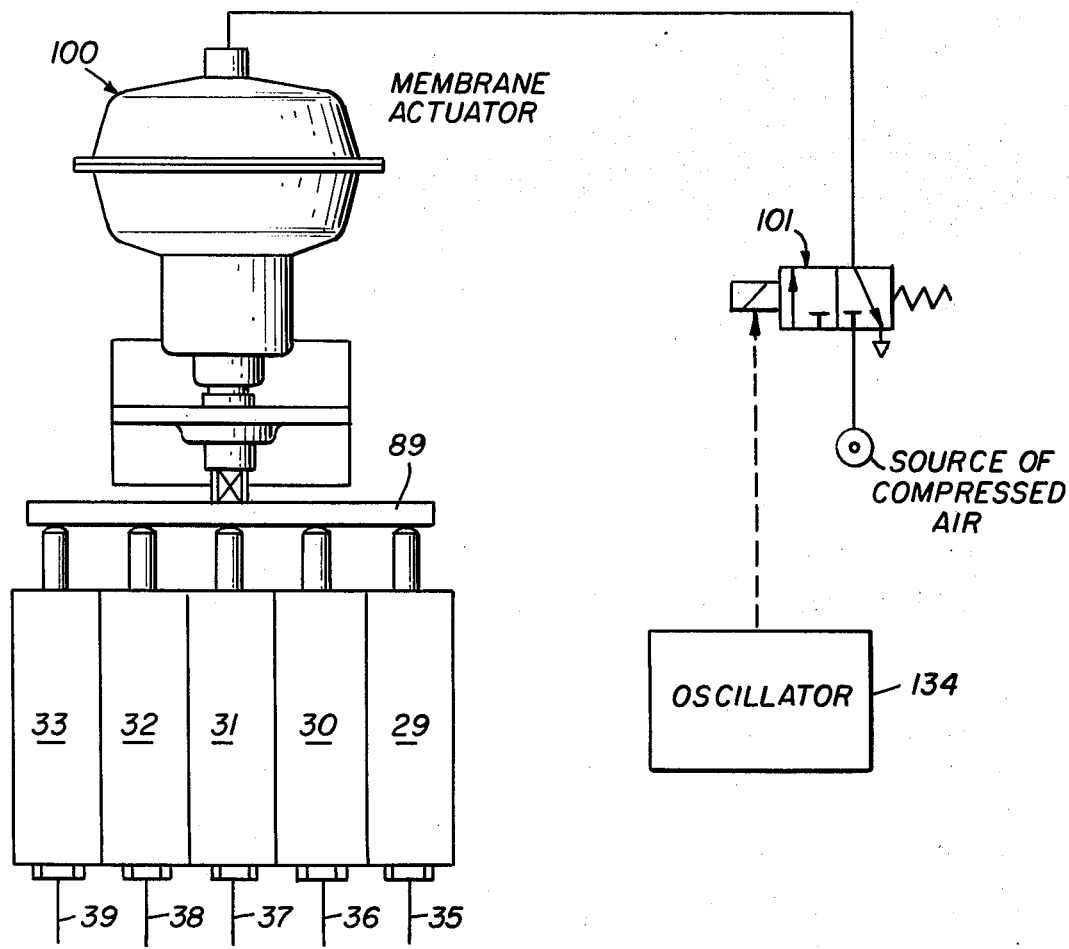
FIG. 5 illustrates a modified embodiment of the invention.
Figure 6:
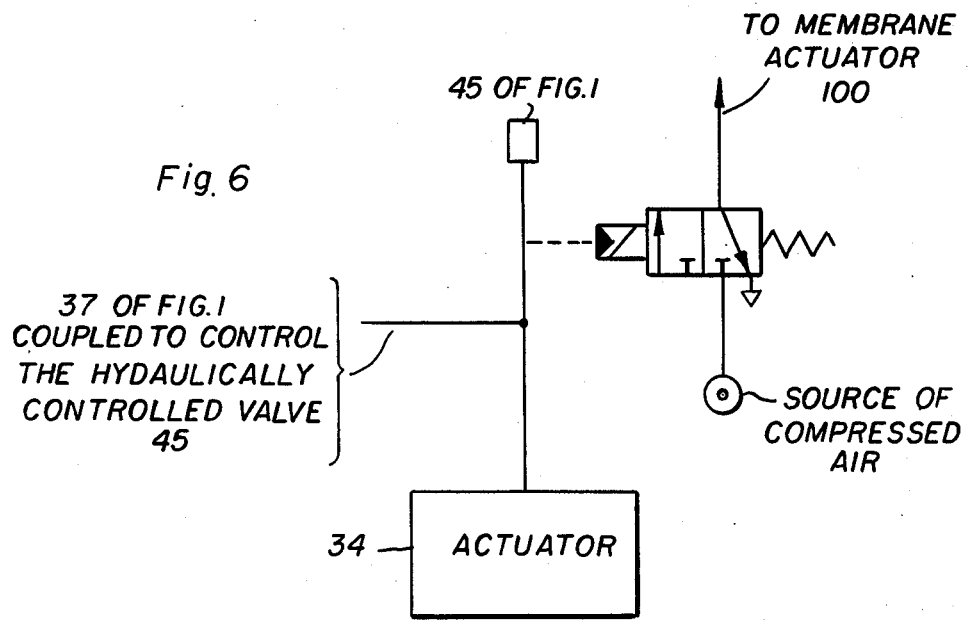
FIG. 6 illustrates a further modified embodiment of the invention.

The auto-controlled oscillating actuator 34 need not directly mechanically drive the pumps 29-33 as described above. As shown in FIG. 5, the pumps can be driven by a simple air-powered membrane actuator or air-powered cylinder 100 that is controlled by a solenoid valve 101, that in turn is controlled by a conventional electrical pulse generating oscillator 134 which shifts the position of the solenoid valve 101. The frequency of the oscillator is adjustable. A combined system, as generally illustrated in FIG. 6, can also be advantageous in which the actuator 34 mechanically drives for instance five pumps as shown and described and also shifts the position of a valve that controls one or more air cylinders that drive a group of pumps each.

It is not necessary that lubricating oil is supplied to a supply conduit of the consumers. The oil can instead be supplied directly through oil lines to the portions of the consumers that is to be lubricated. Also other modifications than implied above can be made within the scope of the claims.

What we claim is:

1. Method of lubricating a plurality of compressed air consuming devices that are independently supplied with compressed air through supply lines controlled by supply valves, the method comprising:

supplying metered flows of lubricant to lubricant supply lines by means of positive displacement pumps, the supply lines being provided with normally closed shut-off valves and leading to the respective air consuming device, the metered flows of lubricant being constantly supplied and kept flowing even when the shut-off valves are closed, operating the positive displacement pumps in synchronism with one another, sensing the air pressure in the air lines downstream of the supply valves, opening the respective shut-off valve in response to the sensed presence of the air pressure in the respective air line being pressurized, and providing pressure relief valves (48-52) in said lubricant supply lines (36-39, 40, 41) to permit the metered flows of lubricant in the lubricant supply lines to escape when the respective shut-off valves are closed, to thereby keep the metered flow of lubricant constantly flowing.

2. Method according to claim 1 comprising operating the pumps at a frequency exceeding 10 pump strokes per minute.

3. Method according to claim 1 comprising operating the pumps at a frequency exceeding 30 pump strokes per minute.

4. Lubricant furnishing system for a plurality of compressed air operated devices (11-16) that are independently supplied with compressed air through air supply lines (17-22) controlled by air supply valves (23-28), comprising:
- a lubricant supply line (36-41) coupled to each air operated device,
- positive displacement pump means (29-33), operated in synchronism with one another, for supplying predetermined metered flows of lubricant to the lubricant supply lines,
- normally closed shut-off valves (42-47) in said lubricant supply lines,
- said pump means (29-33) constantly providing said metered flows of lubricant even when said shut-off valves (42-47) are closed,
- said shut-off valves (42-47) including means (54) for sensing the air pressure in said air lines (17-22) downstream of the supply valves (23-28) and for positively opening the respective shut-off valves (42-47) in response to the sensed presence of air pressure in the respective air lines being pressurized, and
- pressure relief valves (48-52) connected to the lubricant supply lines to permit the respective metered flows of lubricant to escape when the respective shut-off valves (42-47) are closed and to keep the metered flows of lubricant constantly flowing.

5. Lubricant furnishing system according to claim 4 wherein each of the positive displacement pumps (29-33) comprise a plunger (64) in a housing (93), said plungers being actuated by a common actuator (34) having a predetermined frequency.

6. Lubricant furnishing system according to claim 5 wherein the plungers (64) extend out of their housings (93) so that their operation can be visually controlled.

7. Lubricant furnishing system according to claim 5 comprising an intermediate member (89) between said actuator (34) and said plunger (64) which is visually controllable during its operation.

8. Lubricant furnishing system according to claim 7 wherein said intermediate member is a lever (89).

* * * * *